United States Patent Office 3,492,328
Patented Jan. 27, 1970

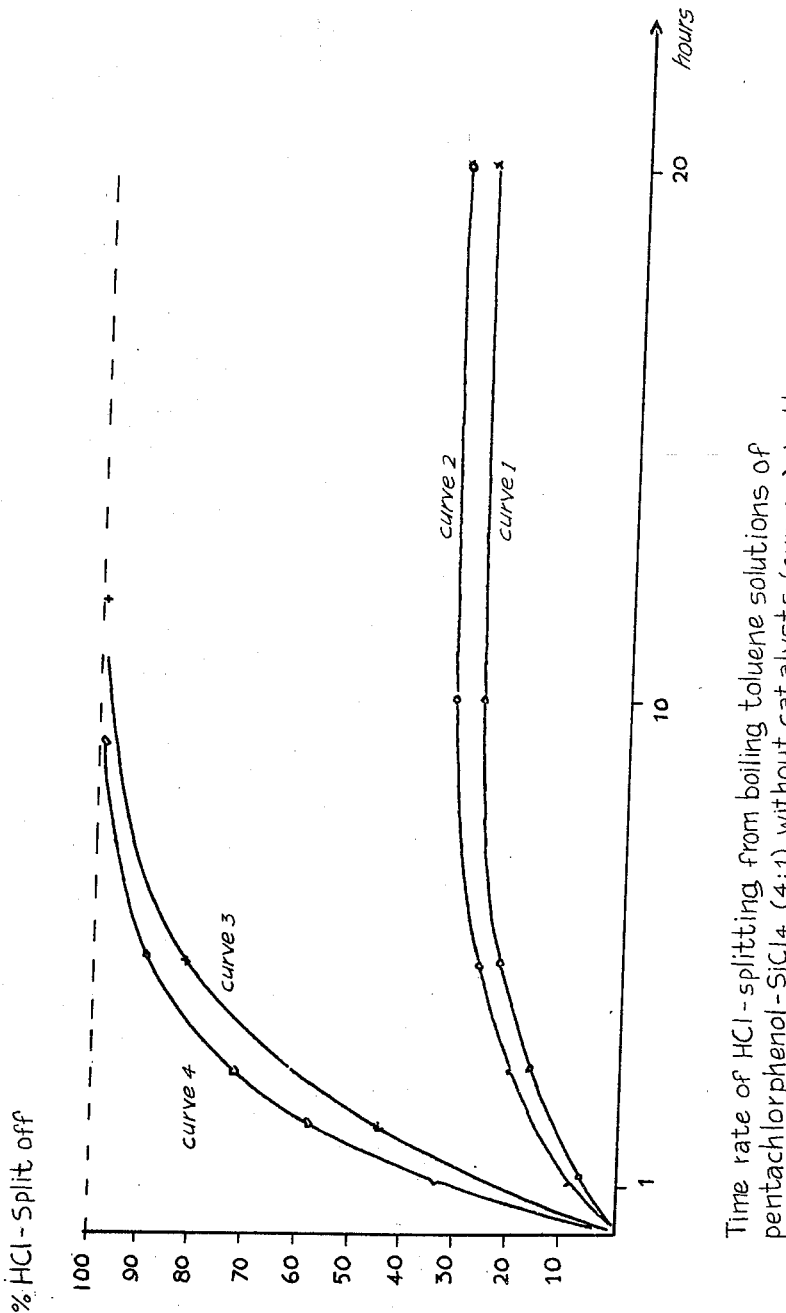

3,492,328
PRODUCTION OF HALOGENATED
TETRAPHENOXYSILANES
Hans-Joachim Kötzsch, Troisdorf, Germany, assignor to Dynamit Nobel Aktiengesellschaft, a corporation of Germany
Filed Dec. 7, 1966, Ser. No. 601,290
Claims priority, application Germany, Dec. 7, 1965,
D 48,847
Int. Cl. C07f 7/04
U.S. Cl. 260—448.8     8 Claims

ABSTRACT OF THE DISCLOSURE

Halogenated tetraphenoxysilanes having the formula:

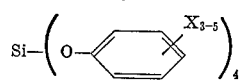

wherein X is fluorine, chlorine or bromine constituting valuable plastic and textile additives being possessed of fire retardant, fungicidal, bactericidal and phytotoxic activities.

The above compounds are prepared by reacting a tetrachlorosilane with a halogenated phenol of the formula:

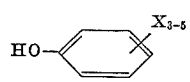

wherein X is as above defined.

---

The invention is directed to halogenated tetraphenoxysilanes of the formula

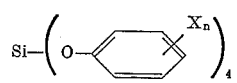

wherein X is fluorine, chlorine or bromine and $n$ is a whole number of 3 to 5 which are prepared by reacting a halogenated phenol of the formula

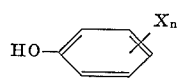

wherein X and $n$ are as previously defined with a tetrachlorosilane in the presence of a tertiary amine or a hydrochloride thereof; the dichlorides of which are thermally unstable under the reaction conditions. The halogenated tetraphenoxysilanes can be used as plastic additives and textile adjuvants.

The present invention relates to a process for the manufacture of halogenated tetraphenoxysilanes which are valuable as plastic additives and textile additives because of their fire-retardant, fungicidal, bactericidal, and phytotoxic properties. More particularly this invention relates to halogenated tetraphenoxysilanes of the formula

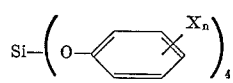

wherein X represents fluorine, chlorine or bromine and $n$ is a whole number of from 3 to 5.

It has already been proposed to manufacture orthosilicates of highly halogenated phenols (tetraphenoxysilanes) by the reaction of the corresponding sodium phenolates with tetrachlorosilane in xylene (J. Org. Chemistry 25 (1960), pp. 1645–1648). In this manner for the first time it was possible to manufacture orthosilicic acid esters of pentachlorophenol and of 2,4,6-trichlorophenol in yields of approximately 30%. This process has numerous disadvantages in addition to the low yield obtained therewith, including the unavoidable use of metallic sodium in order to obtain the sodium phenolates in the necessary high degree of purity, and also the production of large amounts of byproducts, including inorganic salts, whereby the separation of the pure halogenated phenylsilicic acid orthoesters is made considerably more difficult in the main because of their poor solubility. The overall result is that this process cannot be used for industrial production.

Other processes for preparing silicic acid esters of phenols have been disclosed. Thus, for example, it is conventional to prepare special silicic acid orthoesters from readily available esters, e.g., orthosilicate, by way of re-esterification, in the presence, if desired, of acid catalysts such as p-toluenesulfonic acid.

However, it has been found that this process cannot be used for the manufacture of silicic acid orthoesters of highly halogenated phenols. If attempts are made to react such phenols with ethyl orthosilicate in the molten state or in solution, with or without a catalyst, it is found that the condensation at first starts up very slowly and finally comes to a halt before the desired tetraphenoxysilanes have developed.

Another process which has been disclosed for the synthesis of tetraphenoxysilanes comprises the direct condensation of tetrachlorosilane with phenols, with or without solvents, with the liberation of gaseous HCl. However, when attempts are made to react highly halogenated phenols by this process, it becomes apparent that, here again, the condensation takes place very slowly and again incompletely, coming to a halt before the desired tetraphenoxysilanes have developed. The known process and the process of the invention are shown by referring to the accompanying drawing in which the HCl split off in the condensation of pentachlorophenol and SiCl$_4$ (4:1) in boiling toluene without a catalyst (curve 1) in the presence of 0.5% pyridine (curve 2), in the presence of N,N-dimethylaniline (curve 3), and in the presence of p-bromophenyldimethylamine (curve 4) are set out. This reaction can be carried in the presence of excess or stoichiometric quantities of amines, the amines acting as HCl acceptors. Furthermore, a certain catalytic action is associated with these amines, which consists in the fact that the amines form Lewis acid complex compounds with the tetrachlorosilane. Highly halogenated phenols, however, also react in the presence of excess or stoichiometric quantities of amine, e.g., pyridine, not with the formation of tetraphenoxysilanes, but of ammonium salts because of their unusually high acidity. The ammonium salts thus formed are, however, not capable of forming tetraphenoxysilanes.

An object of the invention is to provide a process for the production of halogenated tetraphenoxysilanes from readily available and relatively inexpensive starting materials.

Another object of this invention is to provide a process for the production of halogenated tetraphenoxysilanes which may be practiced efficiently on a commercial scale.

Other objects of the invention will in part be obvious and will in part appear hereinafter.

It has now been surprisingly found in accordance with the invention that halogenated tetraphenoxysilanes of the formula

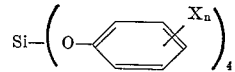

wherein X represents fluorine, chlorine or bromine, and $n$ a whole number of from 3 to 5, can be efficiently prepared by the direct condensation of tetrachlorosilane with a halogenated phenol of the formula

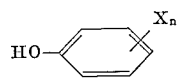

wherein X and n are as above defined in the presence of a tertiary amine or in the presence of a hydrochloride thereof, the dihydrochlorides of which have a hydrogen chloride tension at the reaction temperature which is smaller than the reaction pressure, and if the condensation is carried out at a temperature of 50 to 200° C., preferably 55 to 140° C., a solvent being used if desired.

The reaction according to the instant invention is preferably carried out at normal pressure. However, an excess pressure of up to 12 atmospheres can be used. The use of excess pressures does not offer any important advantages over the normal-pressure procedure when the latter is carried out in the presence of tertiary amines or a hydrochloride thereof having a hydrogen chloride tension of less than 760 mm. Hg.

The reaction can be carried out both in the melted state and in the presence of solvents. Suitable solvents for use in carrying out the process of the present invention include both aliphatic and aromatic hydrocarbons as well as simple and cyclic ethers. As aliphatic hydrocarbon solvents there may be used both homogeneous compounds and mixtures, such as isooctane and gasoline fractions, as for example, fractions having a boiling range of from 120 to 180° C. Benzene, toluene and xylene are examples of aromatic hydrocarbons. Ethers which are suitable for use in the reaction are diisopropylether, diisoamylether, diphenylether and 1,4-dioxane, among others. The aforesaid examples of suitable ethers establish that both aliphatic and aromatic, open-chained ethers can be used.

The tetrachlorosilane and halogenated phenols are used in stoichiometric quantities in the reaction to produce the halogenated tetraphenoxysilanes, i.e., 4 moles of halogenated phenol are used per mole of tetrachlorosilane. The yields of halogenated tetraphenoxysilanes can be improved by the use of an excess of the phenolic compound.

Suitable starting materials for use in the process of the invention are halogenated phenols of the formula previously set out and include such phenols as fluorinated phenols, for instance pentafluorophenol; chlorinated phenols and as 2,3,5-, 2,4,5- and 2,4,6-trichlorophenol, 2,3,4,6-tetrachlorophenol and pentachlorophenol; brominated phenols such as 2,4,6-tribromophenol and pentabromophenol. In addition, mixtures of the aforementioned halogenated phenols can be used in the preparation of the tetraphenoxysilanes according to the invention.

Homogeneous and mixed tertiary amines having aliphatic, cycloaliphatic and aromatic radicals are suitable for use in the process of the invention. A standard for the suitability of a tertiary amine has been established in the HCl tension of the dihydrochlorides at the reaction temperature, which is required to be lower than the reaction pressure. At normal pressure, therefore, those amines are used whose HCl tension in the temperature range of the process is lower than 760 mm. Hg. At normal pressure those amines are preferred whose HCl partial pressures at 50 to 220° C. range from 80 to 700 mm. Hg, that is, the dihydrochlorides of the tertiary amines that are usable according to the invention are thermally unstable in the reaction range.

Suitable tertiary amines having aliphatic radicals include, for example: trimethylamine, triethylamine, triisopropylamine, triisobutylamine, monoethyldiisopropylamine, monoethyl-di-n-butylamine, tri-n-butylamine, N,N,-N′,N′ - tetramethylbutyldiamine-(1,3), N,N,N′,N′-tetramethylethylenediamine, and such having chlorine and cyano-groups as substituents, such as, β-chloropropyldiisopropylamine, tris - (β - chloroethyl) - amine, N,N-di-n-butylaminoacetonitrile, N,N-diisopropylaminoacetonitrile, N-n-butyl-N-methylaminoacetonitrile, and the like. An example of the class of amines containing cycloaliphatic radicals is dimethylcyclohexylamine.

Still further suitable amines include those which have aromatic radicals, such as N,N-dialkylaniline, N,N-dimethylaniline and N,N-diethylaniline and others, p-bromophenyldimethylamine, 2,4-dichlorophenyldiethylamine and N,N,N′N′-tetramethylbenzidine. The aliphatic aromatic amines are especially suited for carrying out the instant process under normal pressure. Also suitable are heterocyclic amines, such as N-n-butylmorpholine. N-phenylmorpholine, N-(4-methylphenyl)-morpholine, morpholine acetic acid morpholide, N,N-dialkyl and N,N-diarylpiperazines, di-n-butylpiperazine, N,N-diphenylpiperazine, N-alkyl and N-arylquinolines, N-n-propyltetrahydroquinoline, N-phenyltetrahydroquinoline, N-alkyl and N-aryl-n-pyrrolidines, N-methylpyrrolidine, N-n-butylpyrrolidine, N-phenylpyrrolidine and the like.

The tertiary amines used as catalysts, or their hydrochlorides, are used in quantities of 0.1 to 20 mole percent, preferably 0.1 to 2 mole percent, of the amount of tetrachlorosilane.

Under the conditions used in accordance with the invention, the condensation takes place rapidly and with the liberation of stoichiometric amounts of gaseous HCl. In this manner, halogenated tetraphenoxysilanes, which can be easily isolated, are produced in good yields and in high purity.

The attached drawing illustrates the liberation of HCl in relation to time in the condensation of tetrachlorsilane and four equivalents of pentachlorophenol in boiling toluene without a catalyst (curve 1); in the presence of small amounts of pyridine (curve 2); N,N-dimethylaniline (curve 3); and p-bromophenyldimethylamine (curve 4). Curves 3 and 4 demonstrate the technical advance achieved by the catalysts used according to the invention.

The halogenated tetraphenoxysilanes produced by the process of the present invention are suitable as plastic additives and textile adjuvants because of their fire-retardant, fungicidal, phytotoxic, bactericidal and insecticidal properties.

In order that the invention may be more fully understood, reference should be had to the following specific examples in which are disclosed processes coming within the scope of the present invention. It will be understood that these examples are given for illustrative purposes merely and are not intended as limitations of the invention.

EXAMPLE 1

1 mole pentachlorophenol (M.P. 188–192° C., re-crystallized from cyclohexane) was dissolved in 1.2 liters of toluene. The solution was distilled for separating out any water present. The dry solution was introduced into a 2-liter flask equipped with an anchor agitator and a reflux condenser. 0.25 mole of tetrachlorosilane was then added to the solution at approximately 56° C. The reaction was initiated by the addition of 0.5 ml. of N,N-dimethylaniline. The mixture was stirred for 2 hours at the boiling temperature of the tetrachlorosilane with brine cooling. Thereafter, the bath temperature was increased to 140–160° C., the reflux condenser being changed over to water cooling. The reaction was carried to completion in 12 to 14 hours under very rapid agitation and intense boiling. The hydrogen chloride which was evolved was carried off through the condenser and a drying tower and absorbed into normal NaOH to control the reaction. Towards the end of the reaction, the tetrakis-(pentachlorphenoxy)-silane was deposited as a heavy precipitate in fine crystals. After the mixture was cooled, the product was separated by suction filtering and re-crystallized from toluene in a Soxhlet apparatus or from HCl-free hydrocarbons, such as carbon tetrachloride, dichlorethane, tetrachlorethane, tetrachlorethylene or chlorobenzene under the exclusion of atmospheric humidity. A yield of more than 90% of pure tetrakis-(pentachloro-phenoxy)- silane was obtained. The product has a melting point of 284–286° C.

Analysis ($C_{24}Cl_{20}O_4Si$).—Calculated: C, 25.42%; Cl, 64.91%; Si, 2.61%. Found: C, 25.98%; Cl, 64.91%; Si, 2.80%.

EXAMPLE 2

By a procedure analogous to that of Example 1, 1 mole of 2,3,4,6-tetrachlorophenol (M.P. 70° C., re-crystallized from glacial acetic acid) was reacted with tetrachlorosilane and the silicic acid orthoester which was formed was isolated after the cooling of the completely reacted mixture by concentrating it to 500 ml. and precipitating with pentane. The crude yield amounted to 87%. Re-crystallization from benzene produced tetrakis-(2,3,4,6-tetrachlorophenoxy)-silane having a melting point of 225° C.

Analysis ($C_{24}H_4Cl_{16}O_4Si$).—Calculated: C, 30.32%; Cl, 59.68%; Si, 2.96%. Found: C, 29.91%; Cl, 60.04%; Si, 3.22%.

EXAMPLE 3

Analogously to Example 1, 1 mole of 2,4,5-trichlorophenol (M.P. 68° C., re-crystallized from light gasoline having a boiling range of 65 to 70° C.) was reacted with tetrachlorosilane and the silicic acid orthoester formed isolated, after the cooling of the completely reacted mixture, by the extensive concentration and crystallization with hexane. The crude yield amounted to 74%. Re-crystallization from light gasoline having a boiling range of 65–70° C. resulted in the recovery of tetrakis-(2,4,5-trichlorophenoxy)-silane, having a melting point of 200° C.

Analysis ($C_{24}H_8Cl_{12}O_4Si$).—Calculated: C, 35.42%; H, 0.01%; Cl, 52.32%; Si, 3.45%. Found: C, 35.27%; H, 0.05%; Cl, 51.89%; Si, 3.71%.

EXAMPLE 4

By a procedure analogous to that of Example 1, 0.1 mole of pentafluorophenol (M.P. 32–33° C.) was reacted with 0.025 mole of tetrachlorosilane in 80 ml. of benzene in the presence of 0.2 ml. of N,N-dimethylaniline by reflux boiling for 12 hours. Then the benzene was removed by evaporation and the raw product remaining in the evaporation concentrate distilled at 1 mm. Hg. The tetrakis-(pentafluorophenoxy)-silane (M.P. 80° C., B.P. 167° C.) was recovered in a 93% yield.

Analysis ($C_{24}F_{20}O_4Si$).—Calculated: C, 37.89%; F, 49.94%; Si, 3.69%. Found: C, 37.94%; F, 50.10%; Si, 3.71%.

EXAMPLE 5

Analogous to Example 1, 1 mole of 2,4,6-tribromophenol (M.P. 93° C., re-crystallized from benzene) was reacted with tetrachlorosilane and the silicic acid orthoester which was formed after concentration to about 500 ml., was brought to crystallization by precipitation with pentane. The crude yield amounted to 84%. After re-crystallization from carbon tetrachloride, the tetrakis-(2,4,6-tribromophenoxy)-silane melted at 225° C.

Analysis ($C_{24}H_8Br_{12}O_4Si$).—Calculated: C, 20.97%; Br, 69.74%; Si, 2.04%. Found: C, 21.11%; Br, 69.60%; Si, 2.31%.

EXAMPLE 6

The procedures set out in Example 1 was followed but in this instance, 0.5 mole of pentabromophenol (M.P. 229° C., recrystallized from benzene) was reacted with 0.125 mole of tetrachlorosilane in 16 hours. The orthoester was produced in the form of a heavy precipitate. The crude yield amounted to 96%. The tetrakis-(pentabromophenoxy)-silane purified by re-crystallization from toluene in the Soxhlet apparatus fused at 365–366° C.

Analysis ($C_{24}Br_{20}O_4Si$).—Calculated: C, 14.61%; Br, 81.21%; Si, 1.44%. Found: C, 14.88%; Br, 80.95%; Si, 1.68%.

I claim:

1. A process for the preparation of a halogenated tetraphenoxysilane of the formula

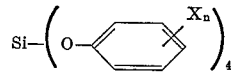

wherein X represents a member selected from the group consisting of fluorine, chlorine and bromine and $n$ is a whole number of from 3 to 5 which comprises condensing at a temperature of 50 to 220° C., a halogenated phenol of the formula

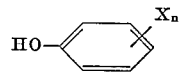

wherein X and $n$ are as above defined with tetrachlorosilane in the presence of a member selected from the group consisting of tertiary amines and hydrochlorides thereof, the dihydrochlorides of which have at the reaction temperature an HCl tension which is lower than the reaction pressure, as catalyst.

2. A process according to claim 1 which comprises effecting said condensation at a temperature of from 55 to 140° C.

3. A process according to claim 1 which comprises effecting said condensation in the presence of a solvent.

4. A process according to claim 1 which comprises utilizing said catalyst in an amount of from 0.1 to 20 mole-percent referred to said tetrachlorosilane.

5. A process according to claim 1 which comprises utilizing said catalyst in an amount from 0.1 to 2 mole-percent referred to said tetrachlorosilane.

6. A process according to claim 1 wherein tertiary amine is an aliphatic-aromatic amine.

7. A process according to claim 6 wherein said tertiary amine is p-bromophenyldimethylamine.

8. A process according to claim 6 wherein in said tertiary amine is N,N-dimethylaniline.

References Cited

UNITED STATES PATENTS 2,182,208 12/1939 Nason _____ 260—448.8 X
2,335,012 11/1943 Johnston _____ 260—448.8 X DELBERT E. GANTZ, Primary Examiner P. I. SHAVER, Assistant Examiner U.S. Cl. X.R.

106—15; 252—8.1, 8.6; 424—184